Sept. 20, 1927.  K. IMHOFF  1,643,273
FISH POND WITH SEWAGE SUPPLY
Filed Aug. 25, 1924
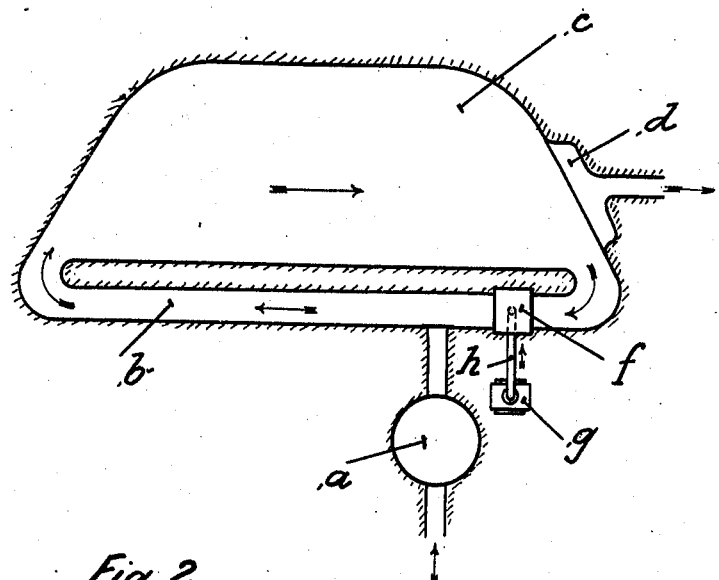
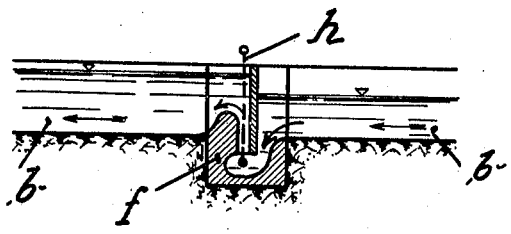
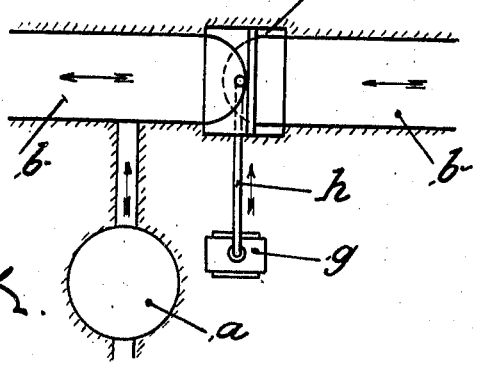

Patented Sept. 20, 1927.

1,643,273

UNITED STATES PATENT OFFICE.

KARL IMHOFF, OF ESSEN, GERMANY.

FISHPOND WITH SEWAGE SUPPLY.

Application filed August 25, 1924. Serial No. 734,010.

If crude domestic sewage is led into a fish pond, the clean water in the latter is displaced by the sewage at its inflow. Thereby, a putrefaction place is formed in the fish pond, which extends farther and farther over the latter and acts detrimentally on the life of the fishes.

Fish ponds can therefore be used only for the treatment of sewage if the latter is (1) freed from sludge in settling basins, and (2) diluted at least with a triple quantity of pure water, for instance spring water or river water, for the purpose of becoming stable by said dilution before its admission to the fish pond.

As it is, however, mostly very difficult to get the required pure dilution water, the present invention has for its object to make said dilution unnecessary by convenient arrangements of the fish pond itself.

The accompanying drawing illustrates said improved arrangement diagrammatically: Fig. 1 is a plan view of a fish pond fitted with the same, while Figs. 2 and 3 are a perpendicular section and a plan view of a detail thereof on a larger scale than that in Fig. 1.

Referring to Fig. 1: $c$ designates a fish pond. The arriving sewage flows first through a settling basin $a$ into a ditch $b$ at one side of the fish pond, both ends of said ditch being in communication with the ends of the fish pond $c$. In said ditch an artificial current of the pond water is produced by means of a lifting pump $f$ arranged in the ditch between the sewage supply to the latter and one end of the fish pond. For the purpose of obtaining, for instance, a triple dilution of the sewage, the triple quantity of pond water is raised by the lifting pump, that is, the sewage receives in the ditch a triple dilution by pond water and arrives thus at the pond itself in diluted condition. A quantity of pond water corresponding to the inflowing sewage escapes continuously through the overflow outlet $d$.

Figs. 2 and 3 show a preferred constructional form of the lifting pump. For raising the water compressed air is employed, which is produced in the engine house $g$ and supplied through a pipe $h$.

The compressed air produces in the upright pump shaft an ascending water motion and compels thereby the pond water to flow along in the ditch $b$ and thus to circulate continuously in the fish pond. The compressed air has the further advantage to supply to the pond water oxygen necessary for the life of the fishes. The pond surface required for the treatment of a certain quantity of sewage can thus become smaller than under conventional circumstances.

By the improved arrangement of the fish pond an equally complete sewage treatment is obtained to that by trickling filters or by activated sludge treatment; said arrangement having furthermore the economical advantage over said latter methods that by the pisciculture revenues are gained.

What I claim, is:—

The combination, with a fish pond containing water, of a ditch at one side of the pond and at both ends in communication with the ends of the latter, a sewage supply to said ditch, an overflow outlet at one end of the pond, and means to create a continuous circulation through said ditch of the pond water and a dilution by the latter of the incoming sewage before its admission to the pond.

In testimony whereof I have hereunto set my hand.

KARL IMHOFF.